United States Patent [19]
Owens

[11] 3,838,768
[45] Oct. 1, 1974

[54] PARTS FEEDING CONVEYOR

[75] Inventor: James S. Owens, Grosse Pointe, Mich.

[73] Assignee: Champion Spark Plug Company, Toledo, Ohio

[22] Filed: Aug. 9, 1972

[21] Appl. No.: 278,925

[52] U.S. Cl.................... 198/218, 198/26, 198/106
[51] Int. Cl............................................ B65g 25/04
[58] Field of Search.......... 198/26, 34, 106, 33 AA, 198/218; 221/297, 293, 289; 74/100, 520, 82

[56] References Cited
UNITED STATES PATENTS

| | | | |
|---|---|---|---|
| 2,650,093 | 8/1953 | Shields | 74/82 X |
| 2,792,922 | 5/1957 | Malhiot | 198/26 |
| 3,556,282 | 1/1971 | Moeltzner | 198/33 AA |

Primary Examiner—Richard A. Schacher
Assistant Examiner—Douglas D. Watts
Attorney, Agent, or Firm—Owen & Owen

[57] ABSTRACT

An improved spark plug insulator feeder is disclosed. A supply feeder delivers insulators, one at a time in desired orientation, to a lineal conveyor which advances the insulators single file to a feeding position adjacent an extreme end of the conveyor. A control including a beam sensor senses the presence or absence of a spark plug insulator at a predetermined location on the lineal conveyor for actuating the supply feeder. An indexing gauge is located adjacent the feeding position for retaining and then releasing a farthest advanced single insulator from the end of the lineal conveyor at predetermined time intervals.

9 Claims, 2 Drawing Figures

PATENTED OCT 1 1974
3,838,768
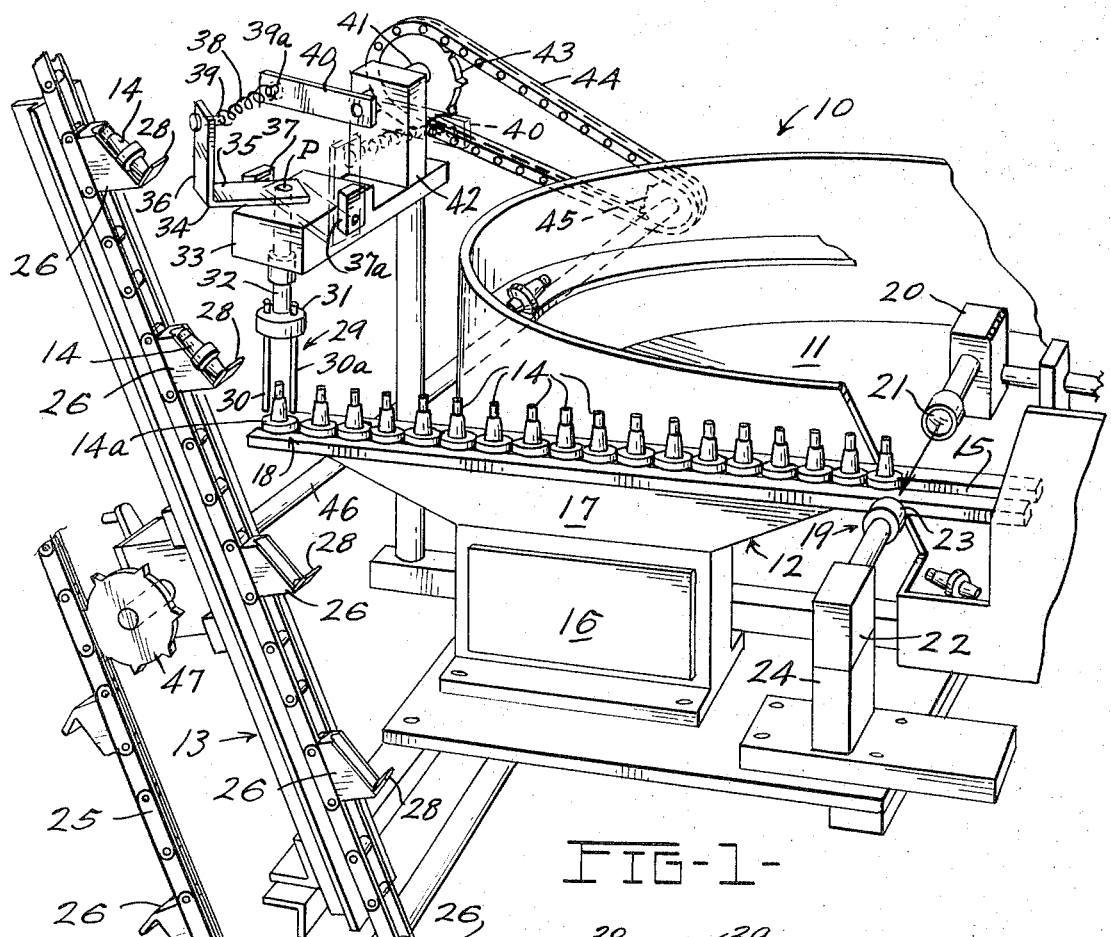
FIG-1-
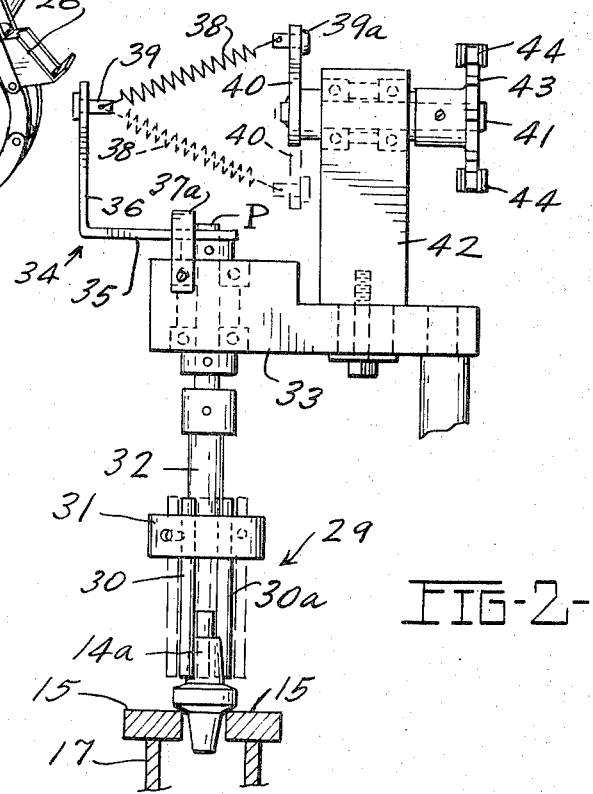
FIG-2-

PARTS FEEDING CONVEYOR

BACKGROUND OF THE INVENTION

The feeder apparatus of the present invention is used in the manufacture and handling of spark plug insulators and similar small articles. The feeder is used for transferring the spark plug insulators from a bulk container to an inclined conveyor which includes space buckets for receiving individual insulators therein.

Prior art parts feeders, such as the type disclosed in U.S. Pat. No. 3,651,985 to Smith, comprise a vibratory centrifugal bowl supply feeder which carries insulators to a vibratory lineal supply feeder which translates the insulators in single file fashion to an inclined bucket conveyor. Beam sensors are located at opposite ends of the lineal feeder. The insulator move along the lineal feeder through the beam sensors which separately control the supply and lineal feeders. The lineal feeder is actuated by a first of the sensors located at a feeding end of the lineal conveyor adjacent the inclined conveyor. Passage of a farthest advanced insulator through the first beam sensor at the feeding end stops the lineal conveyor. When the insulator is taken from the lineal conveyor by a bucket on the inclined conveyor, the absence of the insulator is detected by the first sensor and the lineal conveyor is again actuated to advance another insulator to the feeding position. The beam sensor at the receiving end of the lineal conveyor operates in similar fashion to control the supply feeder. Therefore, as insulators are advanced along the lineal conveyor, the beam sensors regulate the receipt and discharge rate thereof to and from the lineal conveyor.

The discharge of insulators from the prior art feeders, however, is not regulated by the motion of the inclined conveyor, but rather by the beam sensor at the feeding position. Thus when the insulators become irregularly spaced on the lineal conveyor, a bucket can pass the feeding position without receiving an insulator even though the lineal feeder is activated.

SUMMARY OF THE INVENTION

The present invention cures this inadequacy present in prior art feeders through the provision of an indexing gate at the end of the lineal conveyor track. The indexing gate is activated by the motion of the inclined conveyor to retain individual insulators in contiguous relationship on the continuously vibrating lineal conveyor. As a bucket on the inclined conveyor approaches the feeding position of the lineal conveyor, the gate is opened to release a single insulator while the remaining insulators are retained. The next insulator is then advanced to a feeding position for receipt by the next bucket.

The feeder delivers spark plug insulators from a bulk supply to individual insulator buckets on an inclined conveyor. A supply conveyor delivers the insulators one at a time and in desired orientation to one end of a vibratory lineal conveyor. A sensing beam at a predetermined point on the conveyor controls the supply conveyor by sensing the presence or absence of insulators on the lineal conveyor. The insulators advance in single file to an opposite feeding end of the vibratory conveyor. An indexing gate retains the farthest advanced insulator in a feeding position on the lineal conveyor while remaining insulators on the conveyor are retained in contiguous single file relationship by the indexing gate.

The inclined conveyor comprises an endless belt carrying a plurality of spaced-apart buckets for receiving the individual insulators from the feeding position at the end of the lineal conveyor. The indexing gate is activated by means of gearing operatively connected to the inclined conveyor for a periodic release of the insulators. The release of each insulator is timed with the movement of one of the spaced-apart buckets to adjacent the feeding position of the lineal conveyor.

BRIEF DESCRIPTION OF THE DRAWINGS

FIG. 1 is a fragmentary perspective view of the feeding apparatus of the present invention; and FIG. 2 is a detailed elevational view of the indexing gate.

DESCRIPTION OF THE PREFERRED EMBODIMENT

Referring to FIG. 1, feeder apparatus 10 comprising a vibratory supply feeder 11, a vibratory lineal conveyor 12 and an inclined conveyor 13 is shown. The vibratory supply feeder 11 is of conventional design, such as that marketed by the Syntron Company and disclosed in Syntron Bulletin 401,000. Small parts, for example spark plug insulators 14, are placed in bulk in the bottom of the vibratory feeder bowl 11. The insulators 14 are advanced through vibration of the bowl 11, in desired orientation, to a receiving end (not shown) of the lineal conveyor 12. The insulators 14 are transferred from the vibratory supply feeder 11 to the lineal conveyor 12 in an upright position, with the nose or lower end of the insulator body riding within a slotted track 15 of the conveyor 12.

The lineal conveyor 12 comprises a base 16 and a carriage 17 supporting a vibratory motor (not shown). Actuation of the vibratory motor within the carriage 17 causes vibration of the slotted track 15 and effects an advance of the insulators 14 therein from the receiving end of the lineal conveyor 12 toward a feeding position 18 thereon.

A beam sensor 19, mounted on supports 24, is located adjacent the receiving end of the slotted track 15. The beam sensor 19 includes a light source 20, and a focusing lens 21 which directs a light beam from the source 20 across the top of the slotted track 15 to a photo sensing mechanism 22. The photo sensing mechanism comprises a light receiving lens 23 for focusing light from the light source 20 to a conventional photoelectric cell (not shown) which actuated a control mechanism (not shown) for the vibratory supply feeder 11. As the insulators 14 are advanced along the slotted track 15, the tops of the insulators pass through the light beam transmitted from the light source 20 toward the photo sensing mechanism 22. When an insulator thus passes through the light beam, the photo sensing mechanism 22 interrupts the vibratory supply feeder 11. Conversely, when there is no insulator 14 between the light source 21 and the photo sensing mechanism 22, the vibratory supply feeder is actuated to introduce more insulators into the slotted track 15. Thus, the lineal conveyor 12 is automatically supplied with insulators 14 by the vibratory supply feeder 11 whenever there is sufficient space between the insulators 14 on the slotted track 15 to permit transmission of the light beam from the light source 20 to the photo sensing mechanism 22.

The inclined conveyor 13 is located adjacent the feeding position 18 of the lineal conveyor 12. The inclined conveyor comprises an endless chain 25 carrying a plurality of spaced-apart insulator receiving buckets 26. The endless chain 25 is driven in a counterclockwise direction by means of a driven sprocket 27 to carry the buckets 26 in a generally vertical direction past the feeding position 18. A lip 28 on each of the buckets 26 passes within the slotted track 15 adjacent the feeding position 18, catching the farthest advanced insulator 14a to lift such insulator 14a to the bucket 26.

An indexing gate 29 including a pair of opposed retaining fingers 30 and 30a is supported by a head 31 positioned above the feeding position 18. The head 31 is connected to a shaft 32 which is rotatably mounted in a bearing housing 33 which is supported above the slotted track 15. The retaining fingers 30 and 30a extend from the head 31 toward the slotted track 15 a sufficient distance to abut the insulator 14a when the retaining fingers 30 and 30a are in alignment with the slotted track 15, as will be explained below.

The shaft 32 extends through the bearing housing 33 and is connected at point $p$ to a toggle arm 34. The toggle arm 34 consists of a horizontal lever 35 and an integral vertical arm 36. Stop abutments 37 and 37a are connected to the bearing housing 33 for limiting pivotal movement of the toggle arm to an arc described by the horizontal lever 35 as it moves between the stop abutments 37 and 37a. The indexing gate 29, connected to the toggle arm 34, is correspondingly oscillated in an arc equal to the arc described by the horizontal lever 35.

When the horizontal lever 35 is placed against the stop abutment 37 or 37a, one of the retaining fingers 30 or 30a of the indexing gate 29 extends within the path of the slotted track 15 and abuts the farthest advanced insulator 14a at the feeding position 18. When the horizontal lever is osicllated to a point against the other stop abutment 37a or 37, the head 31 carries the retaining finger 30 or 30a out of engagement with the farthest advanced insulator 14a, releasing the insulator to the inclined conveyor 13. When the hoirzontal lever arm 35 reaches the other stop abutment 37a or 37, the retaining finger 30a or 30 is correspondingly positioned within the path of the slotted track 15 and the next farthest advanced insulator 14a moves against the retaining finger 30a or 30 for release to the inclined conveyor 13.

Referring to FIG. 2, one end of a spring 38 is connected to a pin 39 which is pivotally attached to the upper end of the vertical lever 37. The other end of the spring 38 is connected through a second pin 39a to a driven arm 40 which is supported on a shaft 41. The shaft 41 is mounted to rotate on a vertical member 42 which is connected to the bearing housing 33. The shaft 41 extends through the vertical member 42 and is connected to a sprocket 43. The sprocket 43 is driven in a counterclockwise direction by a drive chain 44.

The drive chain 44 engages a sprocket 45 which is keyed to a shaft 46. The shaft 46 is connected to a sprocket 47 which engages the inner surface of the endless chain 25 of the inclined conveyor 13. Constant motion of the endless chain 25 imparts a constant counterclockwise rotating motion to the driven arm 40 through the sprocket 47, the output shaft 46, the sprocket 45, the drive chain 44, the sprocket 43 and the shaft 41.

The shaft 41 is located in the vertical member 42 at a point relative to the toggle arm 34 so that the end of the driven arm 40 connected to the spring 38 is on one side of point $p$ during a first 180° of rotation and then on the opposite side of point p during a second 180° of rotation about the shaft 41. The spring 38 is thereby alternately carried from side to side of pivot point $p$ of the toggle arm 34.

When the toggle arm 34 is at rest against, for example, the stop abutment 37 and driven arm 40 is rotating on the side toward the stop abutment 37, the spring 38, connected to the vertical lever 36, biases the toggle arm 34 against the stop abutment 37. Further rotation of the driven arm 40, however, carries the spring 38 over pivot point $p$. When the spring 38 passes to the opposite side of the pivot point $p$, the toggle arm 34 is biased toward the opposite stop abutment 37a. As the biasing force of the spring 38 increases as the driven arm 40 continues to rotate, the toggle arm 34 snaps against stop abutment 37a. For each rotation of approximately 180° of the driven arm, the toggle arm 34 is snapped from one stop abutment to the other. The indexing gate 29 is correspondingly oscillated or rotated to release an insulator 14a as explained above. Therefore, for each 180° of rotation of the driven arm 40, the single farthest advanced insulator 14a is released to the inclined conveyor 13.

The speed of the driven arm 40 is fixed relative to the speed of the inclined conveyor 13 through the sprockets 43, 45 and 47. The ratios of the sprockets 43, 45 and 47 are determined so that the "dwell" of the indexing gate 29 during rotation of the driven arm 40 is equal to the time required for the endless chain 25 to move a bucket 26 into position for receiving a released insulator 14a. Means are thereby provided for continuously advancing insulators along a lineal conveyor, retaining the farthest advanced insulator against an indexing gate and releasing the farthest advanced insulator to a receiving conveyor at a predetermined period of time.

Although a particular embodiment of the invention has been shown and described, it will be appreciated that various modifications and changes may be made without departing from the spirit and scope of the invention as defined by the following claims.

What I claim is:

1. Apparatus for conveying parts to a feeding position from a supply feeder which delivers the parts one at a time in a desired orientation comprising, in combination, lineal conveyor means for receiving the parts from the supply feeder at one end of said conveyor and advancing the parts therealong to the feeding position adjacent a second end of said conveyor means, means for controlling the supply feeder in response to the presence or absence of parts at a predetermined location on said lineal conveyor, and means adjacent said feeding position for first retaining a farthest advanced part in the feeding position and then releasing such part, said retaining and releasing means including an indexing gate rotatable between a first position and a second position, said indexing gate including means for releasing the farthest advanced part when rotated from the first position to the second position, and trip means for periodically oscillating said indexing gate between the first and second positions, said trip means including a toggle arm having one end operatively connected to rotate said indexing gate and a second end, and resilient overcenter means connected to said second end of said toggle arm for oscillating said toggle arm, whereby said indexing gate is rotated between the first position and the second position, said resilient overcenter means including a rotatable drive arm and a resilient member connected between said second end of said toggle arm and said rotatable drive arm.

2. Apparatus according to claim 1 wherein said controlling means includes a beam sensor located adjacent said predetermined location on said lineal conveyor for detecting the presence or absence of the parts at said predetermined location.

3. Apparatus for conveying parts to a feeding position from a supply feeder which delivers the parts one at a time in a desired orientation comprising, in combination, lineal conveyor means for receiving the parts from the supply feeder at one end of said conveyor and advancing the parts therealong to the feeding position adjacent a second end of said conveyor means, means for controlling the supply feeder in response to the presence or absence of parts at a predetermined location on said lineal conveyor, said controlling means including a beam sensor located adjacent said predetermined location on said lineal conveyor for detecting the presence or absence of the parts at said predetermined location, and means adjacent said feeding position for first retaining a farthest advanced part in the feeding position and then releasing such part, said retaining and releasing means including an indexing gate rotatable between a first position and a second position, said indexing gate including means for releasing the farthest advanced part when rotated from said first position to said second position, and trip means for periodically oscillating said indexing gate between said first and second positions within predetermined periods of time, said trip means comprising a toggle arm operatively connected to rotate said indexing gate, a rotating driven arm, a spring, means connecting said spring from adjacent an end of said toggle arm to adjacent an end of said driven arm, said spring passing through the axis of rotation of said indexing gate twice during each revolution of said driven arm, stop means on opposite sides of said toggle arm for limiting travel of said toggle arm whereby said toggle arm is oscillated between said stop means upon each 180° of rotation of said rotating driven arm.

4. Apparatus for conveying parts comprising a feeder for supplying the parts one at a time in a desired orientation, lineal conveyor means for receiving the supplied parts at one end thereof and for advancing the parts therealong to a feeding position adjacent a second end of said conveyor, means for controlling actuation of said supply feeder in response to the presence or absence of parts at a predetermined location on said lineal conveyor means, said means for controlling said supply feeder comprising a beam sensor located adjacent the predetermined location on said lineal conveyor means, means adjacent said feeding position for first retaining a farthest advanced part in said feeding position and then releasing such part, said retaining and releasing means including an indexing gate rotatable between a first retaining position and a second releasing position, and trip means for periodically rotating said indexing gate between said first and second positions within each predetermined periodic time sequence, said trip means including a toggle arm operatively connected to rotate said indexing gate, an arm rotated by said drive means, and a spring connected between one end of said toggle arm and an end of said rotated arm, said spring passing through the axis of rotation of said indexing gate twice during each revolution of said rotated arm whereby said rotated arm oscillates said toggle arm, an individual part conveyor moving adjacent said feeding position for receiving the released part, and means responsive to the rate of motion of said individual part conveyor for actuating said retaining and releasing means, said actuating means comprising drive means engaging said individual part conveyor and connected to said retaining and releasing means, said drive means actuating said retaining and releasing means in a predetermined periodic time sequence determined by the motion of said individual part conveyor.

5. Apparatus according to claim 4, wherein said indexing gate includes two extending retaining fingers, a rotatable head supporting said retaining fingers, a drive shaft operatively connected to said head and to said toggle arm whereby oscillation of said toggle arm correspondingly oscillates said retaining fingers into and out of engagement with the farthest advanced part in said feeding position in said lineal conveyor means.

6. Apparatus for conveying parts comprising a feeder for supplying the parts one at a time in a desired orientation, lineal conveyor means for receiving the supplied parts at one end thereof and for advancing the parts therealong to a feeding position adjacent a second end of said conveyor, means for controlling actuation of said supply feeder in response to the presence or absence of parts at a predetermined location on said lineal conveyor means, means adjacent said feeding position for first retaining a farthest advanced part in said feeding position and then releasing such part, said retaining and releasing means including an indexing gate rotatable between a first retaining position and a second releasing position, and trip means for periodically rotating said indexing gate between said first and second positions within each predetermined periodic time sequence, said trip means including a toggle arm having one end operatively connected to rotate said indexing gate, and a second end, and resilient overcenter means connected to said second end of said toggle arm for oscillating said toggle, whereby said indexing gate is rotated between the first position and the second position, an individual part conveyor moving adjacent said feeding position for receiving the relased part, and means responsive to the rate of motion of said individual part conveyor for actuating said retaining and releasing means, said actuating means comprising drive means engaging said individual part conveyor and connected to said retaining and releasing means, said drive means actuating said retaining and releasing means in a predetermined periodic time sequence determiend by the motion of said individual part conveyor.

7. Apparatus according to claim 6, wherein said resilient overcenter means includes an arm rotated by said drive means and a spring connected between said second end of said toggle arm and an end of said rotated arm, said spring passing through the axis of rotation of said indexing gate twice during each revolution of said rotated arm whereby said rotated arm oscillates said toggle arm.

8. Apparatus according to claim 6, wherein said means for controlling said supply feeder comprises a beam sensor located adjacent the predetermined location on said lineal conveyor means for detecting the presence or absence of parts on said lineal conveyor.

9. Apparatus for conveying parts to a feeding position from a supply feeder which delivers the parts one at a time in a desired orientation comprising, in combination, lineal conveyor means for receiving the parts from the supply feeder at one end of said conveyor and advancing the parts therealong to the feeding position adjacent a second end of said conveyor means, means for controlling the supply feeder in response to the presence or absence of parts at a predetermined location on said lineal conveyor, and means adjacent said feeding position for first retaining a farthest advanced part in the feeding position and then releasing such part, said retaining and releasing means including an indexing gate rotatable between a first position and a second position, said indexing gate including means for releasing the farthest advanced part when rotated from the first position to the second position, and trip means for periodically oscillating said indexing gate between the first and second positions, said trip means including a toggle arm having one end operatively connected to rotate said indexing gate and a second end, and resilient overcenter means connected to said second end of said toggle arm for oscillating said toggle arm, whereby said indexing gate is rotated between the first position and the second position, said resilient overcenter means including a rotatable drive arm and a resilient spring connected between said second end of said toggle arm and said rotatable drive arm.

* * * * *